(12) United States Patent
Brewer et al.

(10) Patent No.: US 9,267,524 B2
(45) Date of Patent: Feb. 23, 2016

(54) BLIND FASTENER

(75) Inventors: Jonathan Lee Brewer, Dunstable (GB); Carl Hersant, Hertford (GB)

(73) Assignee: AVDEL UK LIMITED (GB)

( * ) Notice: Subject to any disclaimer, the term of this patent is extended or adjusted under 35 U.S.C. 154(b) by 370 days.

(21) Appl. No.: 13/125,109

(22) PCT Filed: Jul. 10, 2009

(86) PCT No.: PCT/GB2009/050827
§ 371 (c)(1),
(2), (4) Date: May 10, 2011

(87) PCT Pub. No.: WO2010/046671
PCT Pub. Date: Apr. 29, 2010

(65) Prior Publication Data
US 2011/0206477 A1 Aug. 25, 2011

(30) Foreign Application Priority Data

Oct. 20, 2008 (GB) .................................. 0819185.0

(51) Int. Cl.
*F16B 13/06* (2006.01)
*F16B 19/10* (2006.01)

(52) U.S. Cl.
CPC .................................. *F16B 19/1054* (2013.01)

(58) Field of Classification Search
CPC .. F16B 19/1054; F16B 19/1045; F16B 13/06; F16B 13/061; F16B 19/1036; F16B 19/1072; F16B 37/067
USPC ................................................ 411/38, 43, 70
See application file for complete search history.

(56) References Cited

U.S. PATENT DOCUMENTS

| 2,061,629 | A | * | 11/1936 | Huck | 411/34 |
|---|---|---|---|---|---|
| 2,538,623 | A | * | 1/1951 | Keating | 411/43 |
| 2,803,984 | A | * | 8/1957 | Swenson | 411/41 |
| 2,887,003 | A | * | 5/1959 | Brilmyer | 411/34 |
| 2,954,718 | A | * | 10/1960 | Brilmyer | 411/70 |
| 3,377,907 | A | * | 4/1968 | Hurd | 411/70 |
| 3,515,419 | A | * | 6/1970 | Baugh | 403/408.1 |
| 4,521,147 | A | * | 6/1985 | King et al. | 411/43 |
| 4,639,174 | A | * | 1/1987 | Denham et al. | 411/34 |
| 4,954,947 | A | * | 9/1990 | Kuriyama et al. | 712/218 |
| 4,958,971 | A | * | 9/1990 | Lacey et al. | 411/38 |
| 5,102,274 | A | * | 4/1992 | Norton et al. | 411/43 |
| 5,248,231 | A | * | 9/1993 | Denham et al. | 411/43 |
| 5,252,013 | A | * | 10/1993 | Browne et al. | 411/43 |

(Continued)

FOREIGN PATENT DOCUMENTS

| CA | 946658 | 5/1974 |
|---|---|---|
| EP | 1498617 | 1/2005 |

(Continued)

*Primary Examiner* — Roberta Delisle
(74) *Attorney, Agent, or Firm* — Vorys, Sater, Seymour and Pease LLP; Rex W. Miller, II

(57) ABSTRACT

A blind fastener comprising a body (22) and a stem (26), wherein the fastener is installed in a workpiece by applying a pulling force to the bodycausing a bulb to form at a radially expandable section of the body, the stem of the fastener comprising two waisted regions (38, 40) of reduced diameter, such that when the body of the fastener is crimped after assembly with the stem, the body is caused to form a barrel shape, whereby clearance between the body and stem is minimized.

11 Claims, 18 Drawing Sheets

(56) References Cited

U.S. PATENT DOCUMENTS

| | | | |
|---|---|---|---|
| 5,346,348 A * | 9/1994 | Denham | 411/43 |
| 5,496,140 A * | 3/1996 | Gossmann et al. | 411/43 |
| 5,503,510 A * | 4/1996 | Golan | 411/43 |
| 5,645,383 A * | 7/1997 | Williams | 411/43 |
| 5,846,039 A * | 12/1998 | Kirchen et al. | 411/34 |
| 6,004,086 A * | 12/1999 | Gand et al. | 411/38 |
| 6,042,313 A * | 3/2000 | Dehlke | 411/43 |
| 6,077,012 A * | 6/2000 | Granese et al. | 411/361 |
| 6,551,040 B1 * | 4/2003 | Terry et al. | 411/43 |
| 6,854,940 B2 * | 2/2005 | Jennings et al. | 411/38 |
| 7,198,444 B2 * | 4/2007 | Piacenti et al. | 411/38 |
| 7,396,287 B2 * | 7/2008 | Jennings et al. | 470/29 |
| 2005/0013678 A1 * | 1/2005 | Smith | 411/43 |
| 2010/0329811 A1 * | 12/2010 | Smith et al. | 411/43 |

FOREIGN PATENT DOCUMENTS

| | | |
|---|---|---|
| GB | 2127514 | 4/1984 |
| GB | 2269873 | 2/1994 |

* cited by examiner

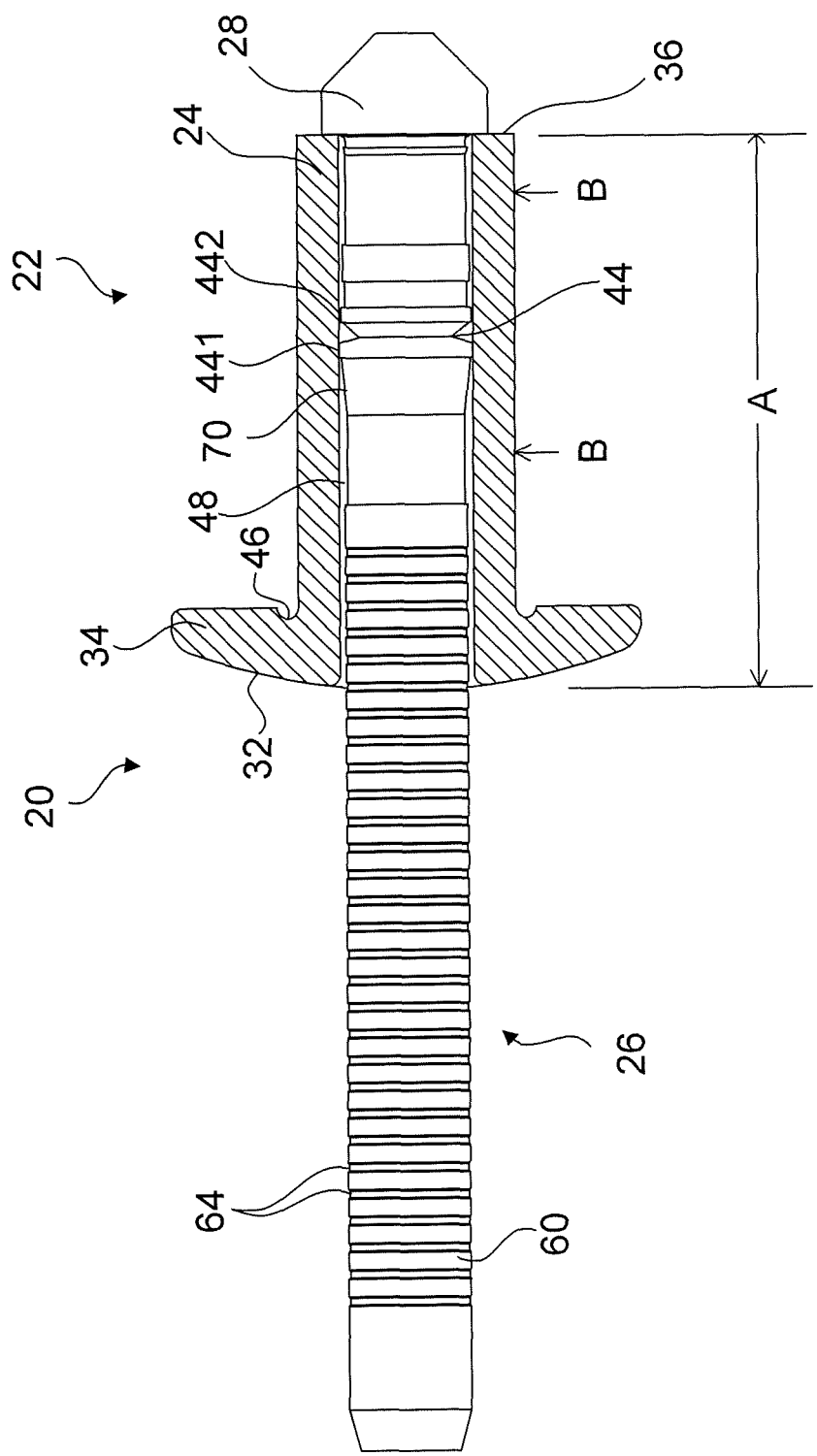

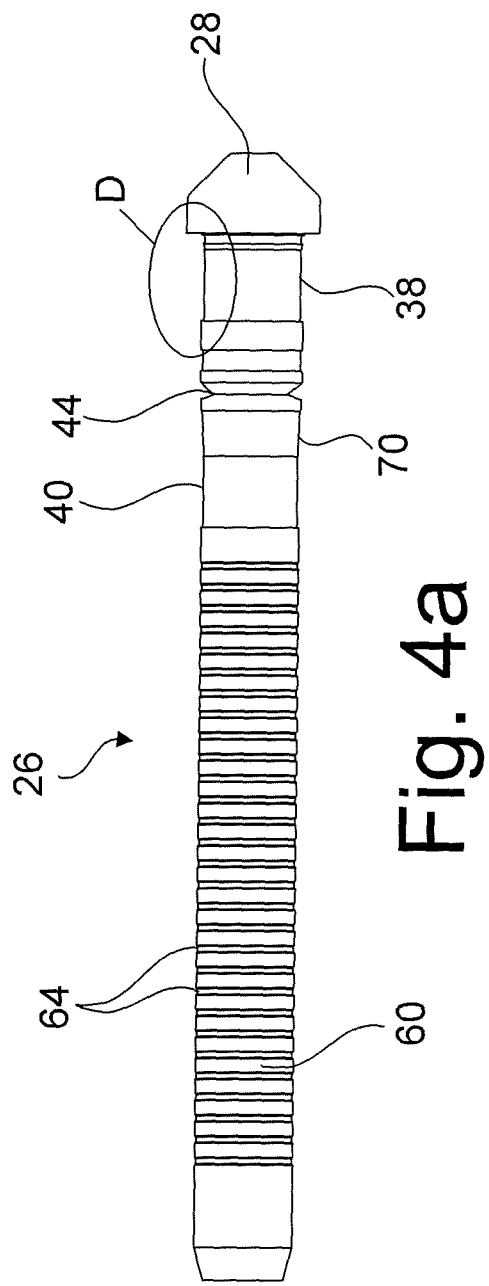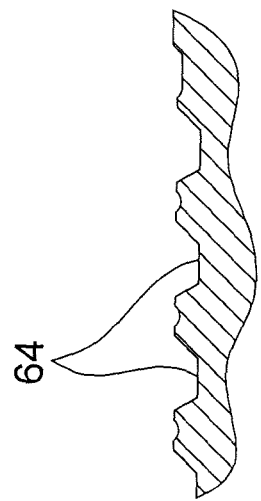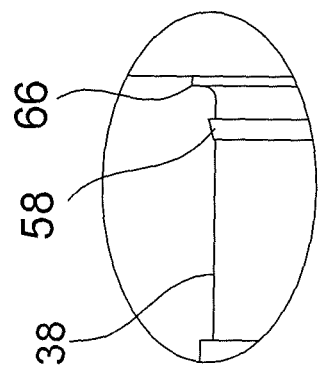

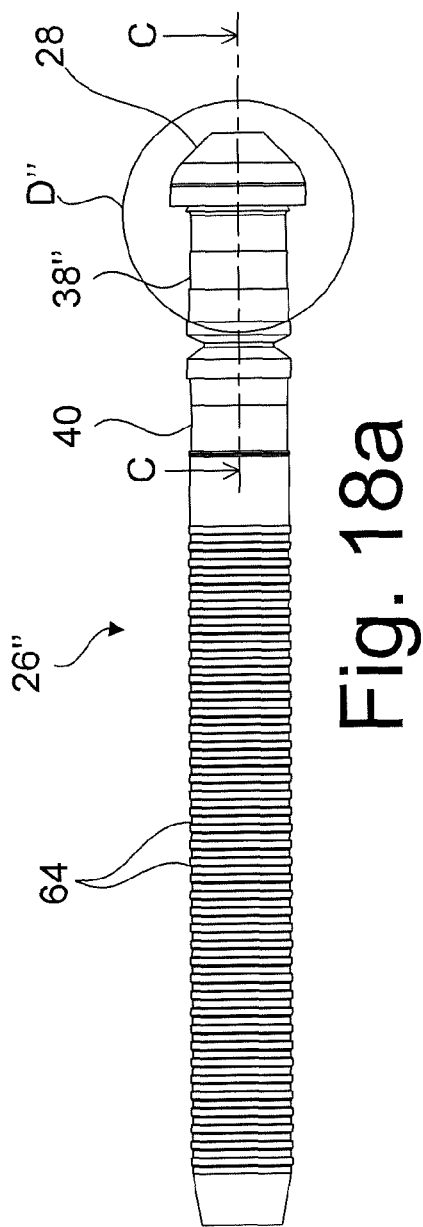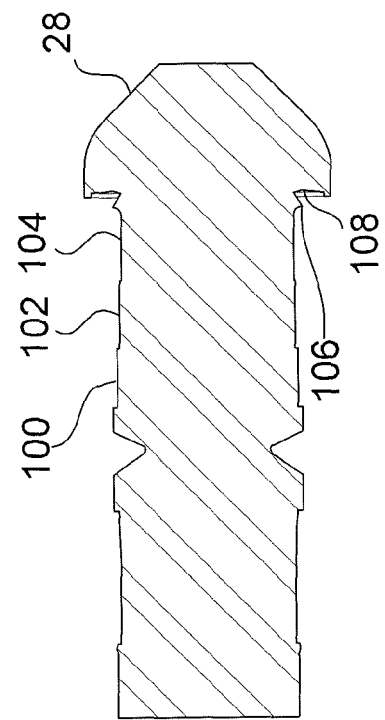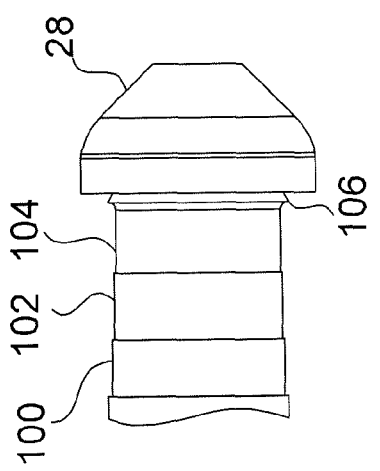

1

BLIND FASTENER

BACKGROUND AND SUMMARY

This invention relates to blind fasteners, and in particular to blind fasteners wherein bulbing of the fastener is caused during installation of the fastener into a workpiece.

Blind fasteners (i.e. fasteners which can be installed by access to one side only of the workpiece) are well known.

Commonly a blind fastener comprises a tubular body having an elongated shank, a preformed radially enlarged body head at a one end (the head end) of the body, a stem having a radially enlarged stem head at one end, wherein the stem extends through the core of the body such that the stem head is at a tail end of the body remote from the head end, and an end portion of the stem protrudes from the head end of the body. The fastener is inserted through aligned apertures in the workpiece comprising workpiece members to be secured together, such that the body head abuts the near face of the workpiece and the tail end portion of the body shank protrudes beyond the remote face (the blind face) of the workpiece. An installation tool is then used to apply an increasing pulling force to the protruding portion of the stem relative to the body, the reaction force being supported by the body head, so that the stem head deforms the tail end portion of the body shank radially outwards and axially towards the body head, to form a blind bulb which abuts the blind face of the workpiece. The workpiece members are thus clamped together between the body head and the blind bulb. Usually the stem is then broken off flush with, or slightly inside, the head of the body, at a breakneck groove preformed at the appropriate position along the stem. The breakneck breaking load is greater than the load needed to completely form the blind bulb.

Blind fasteners which provide a high level of static and dynamic joint strength need to develop a high retained compressive force on the workpiece, between the body head and blind bulb. Accordingly it is desirable to have a relatively large preformed body head, and also to have a relatively large contact area between the blind bulb and the blindside of the workpiece. The area of contact between the blind bulb and the blindside of the workpiece is known as the blindside footprint.

Fasteners are also known, such as those available under the trade marks STAVEX or Masterfix K-Lock, which develop multiple bulbs on installation into a workpiece, therefore allowing the fastener to cover a large grip range, i.e. to be capable of securing together workpieces having varying 'grips', i.e. varying total thicknesses of workpiece members.

However, during installation of a multiple bulbing fastener, each bulb will be formed at a particular point of the installation, i.e. when the fastener has been pulled relative to the sleeve by a particular amount. At certain thicknesses within the grip range of a multiple bulbing fastener, the cross-sectional area of the bulb in contact with the rear face of the fastened workpiece will be very low, and for certain 'intermediate' workpiece thicknesses, there will be a "stand-off", whereby minimal or no footprint is generated on the blindside of the workpiece, because installation completes before the complete formation of a particular bulb. This results in a substantial reduction in fastening strength provided by the installed fastener.

The above situation is illustrated in FIG. 1, in which installation of the fastener 2, having a body 4 and stem 6 with a stem head 8, has completed at a particular stage wherein a bulb 10 has been formed but wherein no footprint is formed on the blindside of the workpiece 14.

An ideal fastener would produce a single bulb on the blindside of a workpiece, to prevent the above "stand-off" situation, and would do so consistently over a large grip range.

Certain known fasteners such as those available under the trade marks AVIBULB and AVINOX, employ a twin tapered fastener body form which forms a single bulb on the blindside of the workpiece, to achieve a wide grip range. This form of opposing tapers, as illustrated in FIG. 2, can be likened to a "barrel shape". The tapered form is rolled onto the body 4' of the fastener 2' of FIG. 2 such that the minimum inner diameter of the body 4' is approximately equal to the outer diameter of the fastener stem 6'. The body 4' is then assembled onto the stem 6' by a push-fit.

As can be seen in FIG. 2, a consequence of the above design is that there is a significant amount of clearance (indicated at 12) between most of the body 4' and the stem 6'. Clearance between the body 4' and the stem 6 is not desirable as it can lead to tilting of the stem 6 and the bulb which is formed during installation of the fastener into a workpiece.

A further disadvantage of such multiple bulbing fasteners as AVIBULB and AVINOX is the stem must be dimensioned such that the outer diameter is no greater than the minimum inner diameter of the rolled body to facilitate assembly of the body and stem. The pulling force for installing the fastener is therefore limited by the maximum allowable diameter of the stem 6', and the shear strength offered by the installed fastener is accordingly limited.

Furthermore, a limited outer diameter of fastener stem also results in a risk of failure, i.e. breaking of the stem, at positions other than the breakneck during installation, a limited area of contact for the jaws of the installation tool which can lead to jaw slippage, and a limited resistance to bending forces during fastener assembly of the fastener and during installation into a workpiece.

It is an aim of the present invention to overcome or at least mitigate the above problems and provide an improved blind fastener which produces a single bulb, having a large blindside footprint, consistently over a wide grip range.

Accordingly, the present invention provides, in one aspect, a blind fastener according to claim 1 of the appended claims.

The bulb resulting from installation of the blind fastener of the present invention provides a single blindside bulb over a large grip range. In the present invention, the diameter of the stem is not restricted by the minimum inner dimension of the body before installation, and accordingly the pulling force required to install the fastener is not limited. As a stem having a greater diameter can be used, the potential for the stem breaking at a position other than the breakstem groove is reduced, the risk of installation tool jaw slippage is reduced, and the resistance to bending forces during assembly of the fastener and installation into a workpiece is increased. The present invention therefore provides a fastener which can be reliably installed to form a fastening having a high shear strength, over a large grip range.

After crimping of the body to cause material of the body shank to enter the first and second waisted regions, a barrel shape is formed by the body shank, thereby ensuring that on installation of the fastener into a workpiece, the bulb is formed in a controlled and predictable manner. The barrel shape formed by the body shank of the present invention is improved over that of prior art embodiments as the waisted regions allow the body shank to be deformed down to a reduced diameter but the remainder of the stem to remain at a diameter greater than the waisted regions.

A tapered portion is provided leading up to at least one of the waisted regions. The tapered portion is preferably located between the breakneck groove and the second waisted region, and has the effect of minimising the clearance between the internal surface of the body core and the stem outer surface. An advantage of reducing the clearance between the body and stem is that the potential for tilting of the stem or of the bulb formed during installation of the fastener into a workpiece is decreased.

The first waisted region may be located adjacent the stem head and the second waisted region located further away form the stem head than the second waisted region is located, such that the breakneck groove is between the first waisted region and the second waisted region.

A stepped portion may be provided between the first waisted region and the breakneck groove, the stepped portion having a diameter intermediate the minimum diameter of the first waisted portion and the diameter of the stem head. The stepped portion provides an increased resistance to removal of the stem from an installed fastener.

One or more radial projections may be provided on the stem at the first waisted region. The radial projections may have an asymmetrical triangular cross-sectional form and/or a rounded tip. The radial projections provide an increased resistance against removal of the installed fastener from a workpiece into which it has been installed.

The body of the fastener may include an annular underhead recess, providing easier clearance of burrs around the edge of the hole in the workpiece, and an enhanced fatigue strength of the installed fastener.

The first waisted region may comprise a plurality of stepped portions, thereby providing an increased resistance against removal of the installed fastener from a workpiece into which it has been installed.

The stem of the fastener may be provided with an annular underhead recess, whereby, on installation of the fastener into a workpiece, material of the body is forced into the recess, thereby preventing "stem head entry" failure wherein the tail end of the body spills out from the stem underhead region.

The stem may further comprise a protruding ridge of stem material adjacent the recess. The combination of the recess and the protruding ridge act to lock the body to the stem axially in the underhead region.

The present invention also provides, in a further aspect, a method of manufacturing a blind fastener. The method of manufacture includes forming a first and a second waisted region in the stem such that after the step of deforming the body, the body comprises a barrel shape, thereby minimising clearance between the body and the stem, and thereby reducing the potential for tilting of the stem and/or the bulb of an installed fastener.

The step of forming the first and second waisted region may comprise rolling, and the step of deforming the body may comprise crimping.

The method may further comprise the formation of one or more radial projections on the stem at a waisted region, wherein the step of deforming the body causes the at least one radial projection to embed into the body.

The first waisted region may be formed into a plurality of stepped portions.

The manufacture of the fastener may further comprise a step of forming an underhead recess. The recess may be formed in a cold-heading step, and the ridge may be formed by rolling, wherein material displaced from the first waisted region during rolling forms a protruding ridge of stem material adjacent the recess.

BRIEF DESCRIPTION OF THE DRAWINGS

An embodiment of the present invention will now be described by way of example and with reference to the accompanying drawings in which:

FIG. 3 is a side elevation of a fastener in accordance with the present invention (with the body shown in cross-section) prior to crimping of the body, and prior to installation of the fastener in a workpiece;

FIG. 4a is a cross-sectional elevation of the stem of the fastener of FIG. 3;

FIG. 4b is a detailed underhead view of the stem of FIG. 4a at D;

FIG. 4c is a detailed view of the pull grooves of the stem of FIG. 4a;

FIG. 5b is an elevation of the head end of the body of FIG. 5a;

FIG. 5c is a detailed underhead view of the body of FIG. 5a;

FIG. 18a is a side elevation of the stem of the fastener of FIG. 16;

FIG. 18b is a detailed view of the stem of FIG. 18a at D";

FIG. 18c is a partial cross-sectional elevation of the stem of FIG. 18a along the line C-C.

DETAILED DESCRIPTION OF THE DRAWINGS

Figure 1:
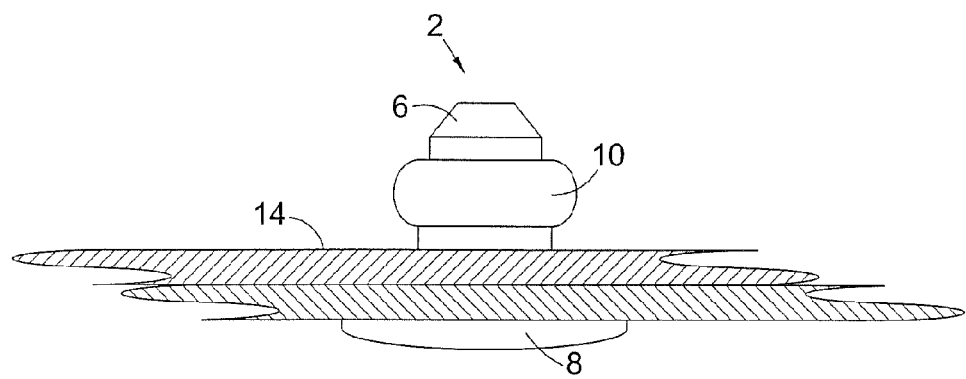
FIG. 1 is a cross-sectional view of a multiple bulbing fastener in accordance with the prior art, installed in a workpiece.
Figure 2:
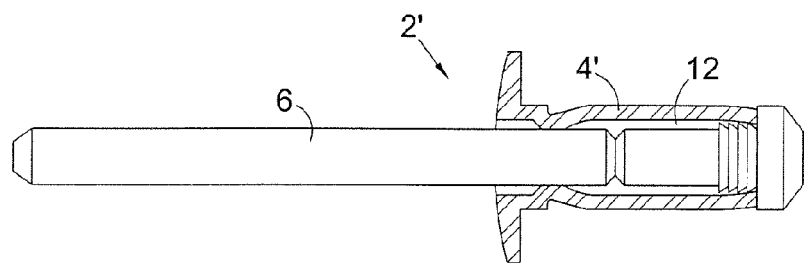
FIG. 2 is a cross-sectional view of a twin-tapered fastener in accordance with the prior art, prior to installation in a workpiece.

Referring to FIG. 3, the fastener 20 comprises a body 22 and a stem 26. The stem 26 (FIG. 4a) is provided with a shaft 60, an asymmetric breakneck groove 44, a stem head 28 having a conical end form, and a plurality of pull grooves 64. The body 22 (FIG. 5a) is provided with a core 30, a head end 32 and a tail end 36 remote from the head end 32, and a radially enlarged body head 34 at the head end 32. The body 22 is provided with an annular underhead recess 46, shown in detail in FIG. 5b.

Manufacture of the fastener 20 includes rolling a first waisted region 38 and a second waisted region 40 onto the stem 26. The waisted regions 38, 40 have a smaller diameter than the remainder of the stem 26. The first waisted region 38 is located adjacent the stem head 28, and the second waisted region 40 is located further away from the stem head 28, beyond the breakneck groove 44, i.e. such that the breakneck groove 44 is between the first waisted region 38 and the second waisted region 40.

On formation of the waisted regions 38, 40, a tapered portion 70 is also formed in the stem 26, leading up to the second waisted portion 40, on the side of the breakneck groove 44. A radial projection 58 is also formed, within the first waisted region 38, and a stepped portion 66, between the first waisted region 38 and the stem head 28. The diameter of the step 34 is intermediate the diameter of the first waisted region 38 and the stem head 28.

Figure 5A:
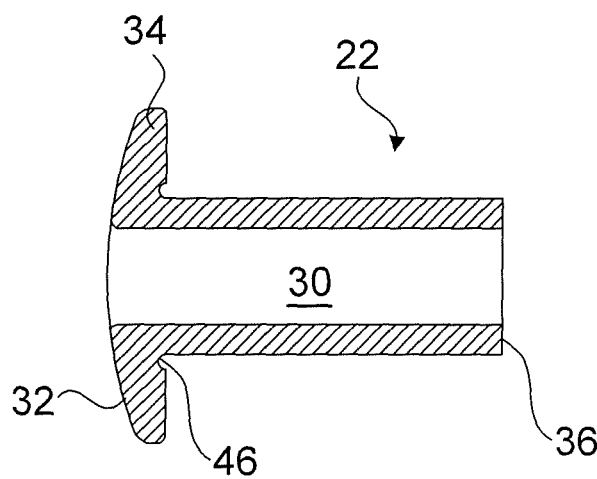
FIG. 5a is a longitudinal cross-sectional elevation of the body of the fastener of FIG. 3.
Figure 5B:
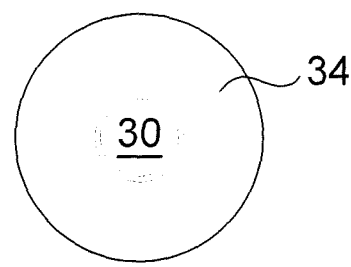
Figure 5C:
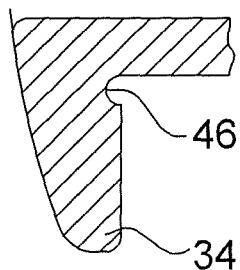

After the stem 26 has been formed as above, the stem 26 is inserted into the core 30 of the body 22 by a push-fit (due to diameters 441 and 442 of the stem 26). As illustrated in FIGS. 3 and 5a, the shank 24 of the body 22 initially has a straight cylindrical form, i.e. is of an equal outer diameter along the length of the shank 24. After assembly of the body 22 onto the stem 26, the body 22 covers a portion of the stem 26, as indicated by 'A' in FIG. 3. It can be seen that the clearance 48 between the internal surface 72 of the body 22 defining the core 30 and the outer surface 74 of the stem 26 is minimal for most of the length of A, apart from the regions, indicated by 'B' in FIG. 3, which directly surround the first and second waisted regions 38, 40 of the stem 26.

The body shank 24 is deformed by a twin taper crimp. The crimping is performed on the body shank 24 at regions B of FIG. 3, i.e. the regions which immediately surround the first waisted region 38 and the second waisted region 40 of the stem 26. The first and second waisted regions 38, 40 therefore accommodate the material of the body shank 24 which is deformed by the crimping.

Figure 6:
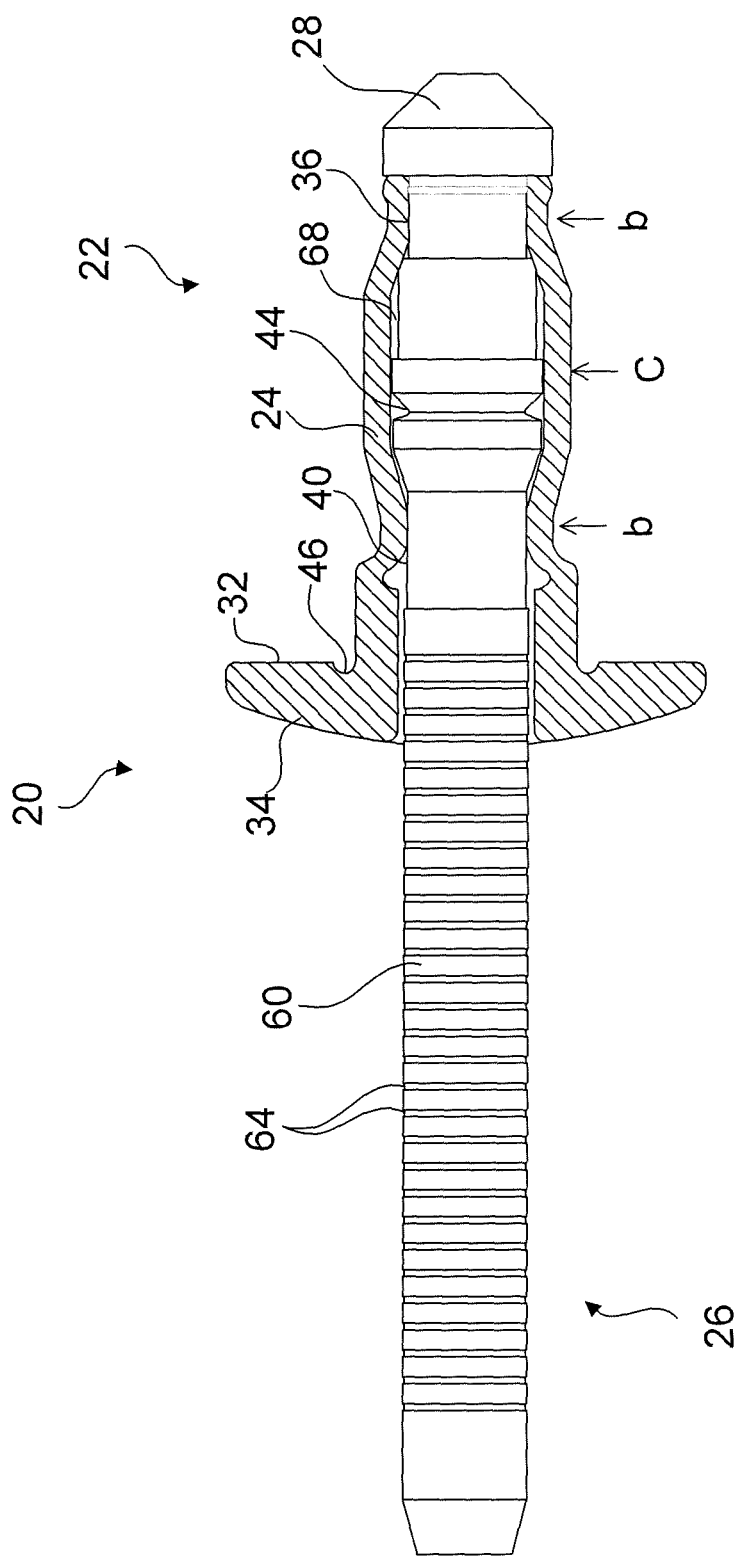
FIG. 6 is a cross-sectional elevation of the fastener of the fastener of FIG. 3 after crimping of the body onto the stem and prior to installation in a workpiece.

As a result of material of the body shank 24 entering the first waisted region 38 and the second waisted region 40, part of the body shank 24 forms a "barrel shape", i.e. including two sections having a reduced diameter, indicated by 'b' on FIG. 6, and a section having a greater diameter, indicated at C on FIG. 6, between the two reduced diameter sections b. As a result of the barrel shape, there is very little, or no clearance 68 between the internal surface 72 of the body shank 24 defining the core 30 and the outer surface 74 of the stem 26 after crimping of the body shank 24. The tapered portion 70 provides that clearance between the internal surface 72 of the body shank 24 and the outer surface 74 of the stem 26 at the second waisted 40 is further minimised.

Also as a result of the crimping, radial projection 58 is caused to embed into the material of the body shank 24 which is crimped into the first waisted region 38, as illustrated in FIG. 6.

Installation of the fastener 20 into a workpiece 50 comprising a plurality of workpiece members 52, 54 is effected in the same manner as described in the preamble in respect of prior art embodiments.

On installation the barrel shape of the body shank 24 ensures formation of the bulb 42 (FIGS. 7, 8, 10 and 11) in a controlled and predictable manner. The force applied to the stem 26 with respect to the body 22 is increased, and the bulb 42 begins to form at a predetermined pulling force.

Figure 7:
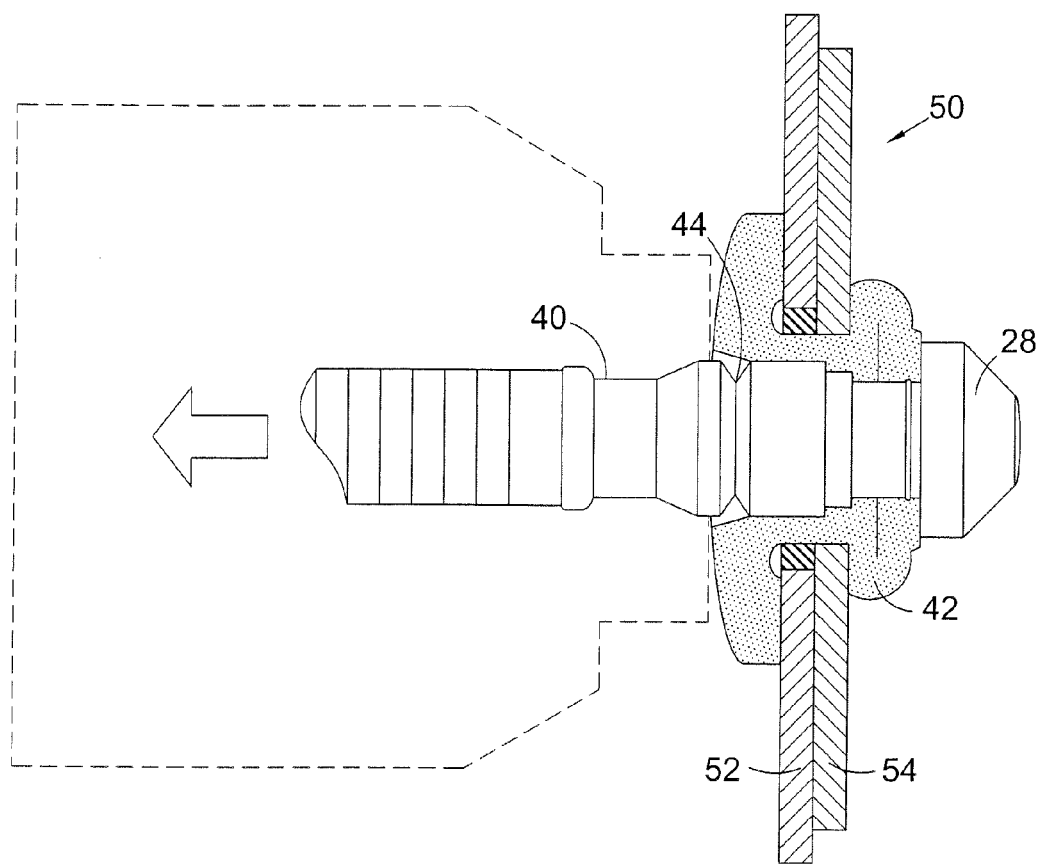
FIG. 7 is a cross-sectional elevation of the fastener of FIG. 3 during installation into a workpiece at the minimum end of the grip range.
Figure 8:
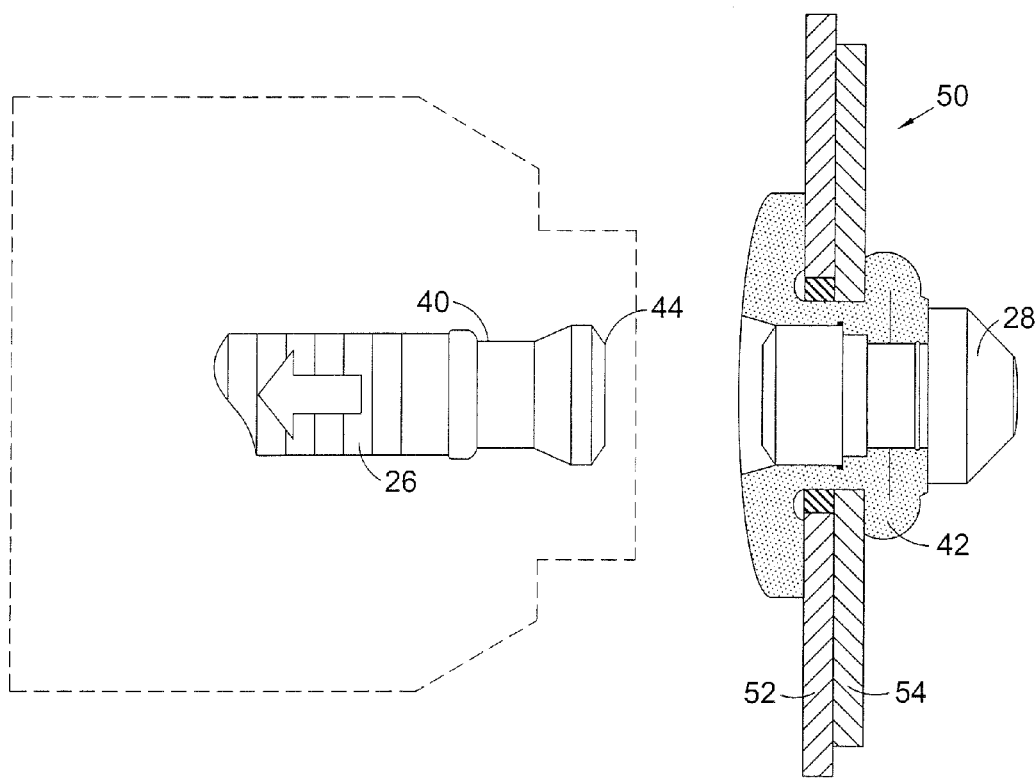
FIG. 8 is a cross-sectional elevation of the fastener of FIG. 7 completely installed in the workpiece.
Figure 9:
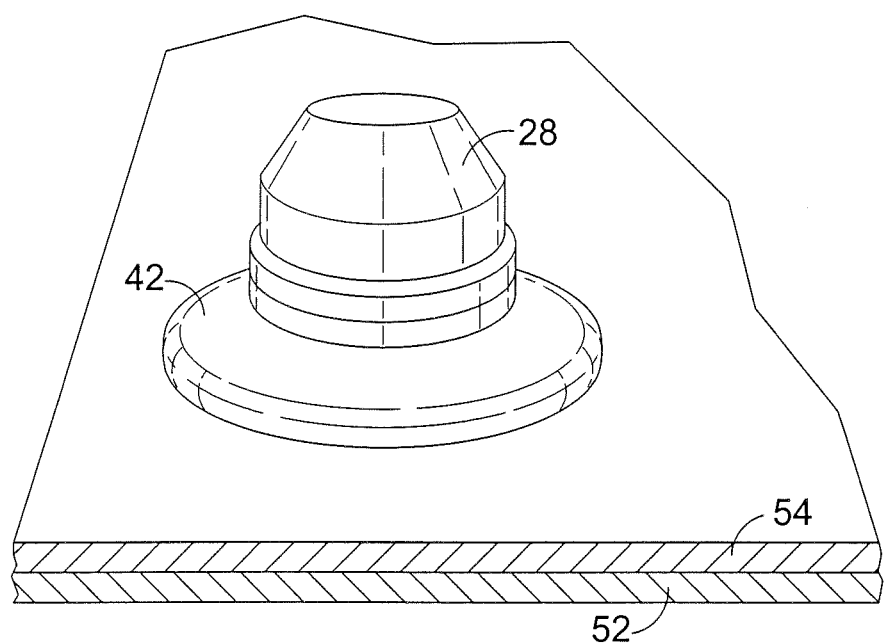
FIG. 9 is an isometric view of the installed fastener of FIG. 8 from the blindside of the workpiece.

At lower grip values, i.e. workpieces having a lower total thickness, the tapered portion 70 and the diameter 442 assist in formation of the bulb 42 against the rear workpiece member 54, by progressively opening out the crimped body material closest to the blindside of the workpiece 50. Therefore a "stand-off" situation, as described in the preamble, is avoided. Formation of a bulb 42 at the minimum grip value is illustrated in FIGS. 7 and 8. The blindside footprint 56 at the minimum grip value is illustrated in FIG. 9.

Once the fastener 20 has been installed in a workpiece 50, the stepped portion 66 between the first waisted region 38 of the stem 26 provides an increased resistance to removal of the stem 26 from the body 22 of an installed fastener.

The annular underhead recess 46 provides an enhanced fatigue strength of the installed fastened, and easier clearance of burrs.

Figure 10:
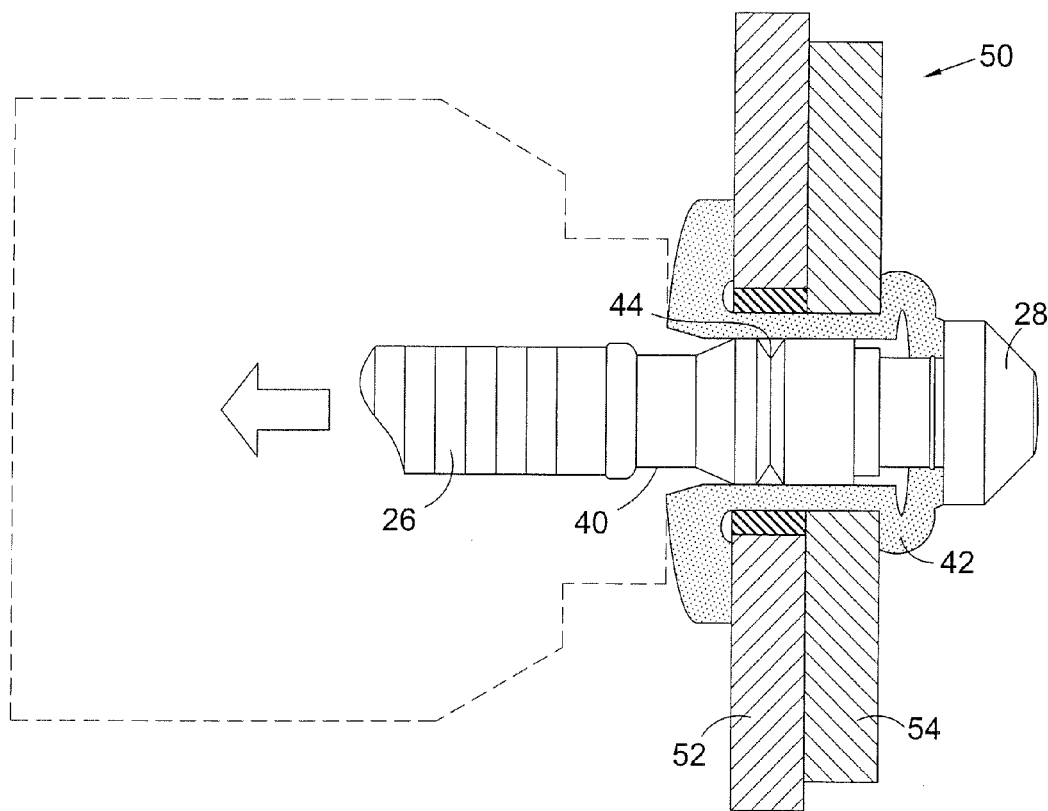
FIG. 10 is a cross-sectional elevation of the fastener of FIG. 3 during installation into a workpiece at the maximum end of the grip range.
Figure 11:
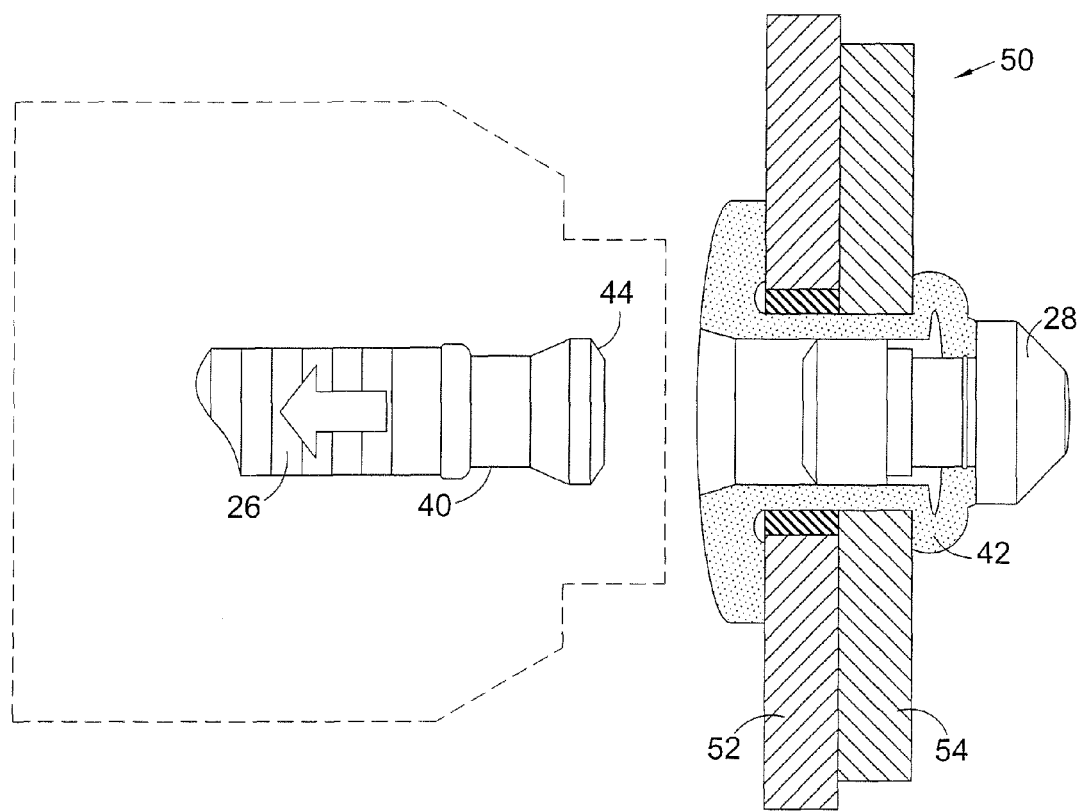
FIG. 11 is a cross-sectional elevation of the fastener of FIG. 10 completely installed in the workpiece.
Figure 12:
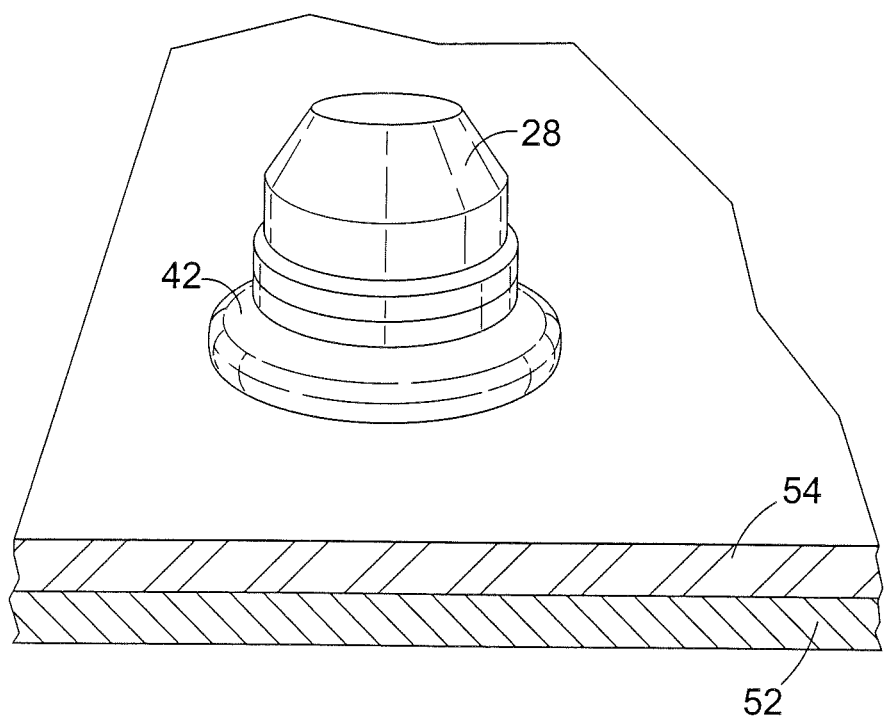
FIG. 12 is an isometric view of the installed fastener of FIG. 11 from the blindside of the workpiece.
Figure 13:
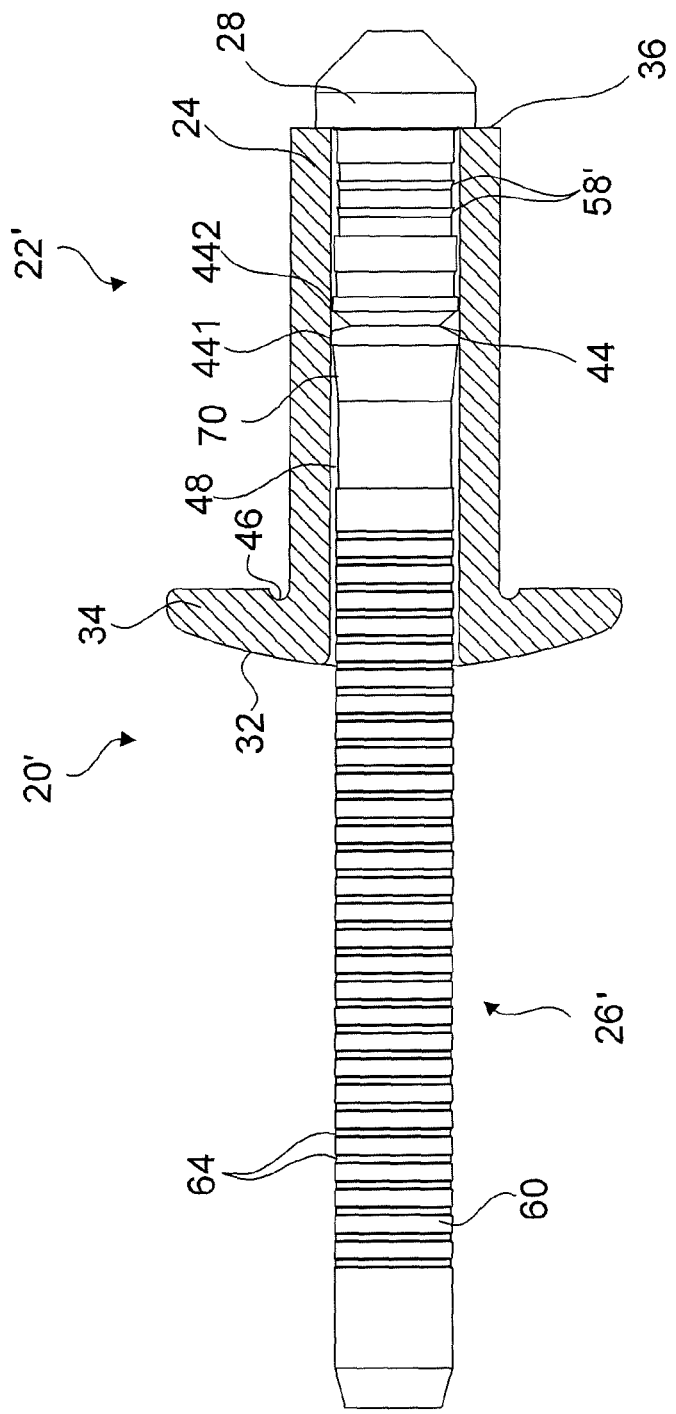
FIG. 13 is a side elevation of an alternative embodiment of fastener in accordance with the present invention, (with the body shown in cross-section), prior to crimping of the body, and prior to installation of the fastener in a workpiece.
Figure 14A:
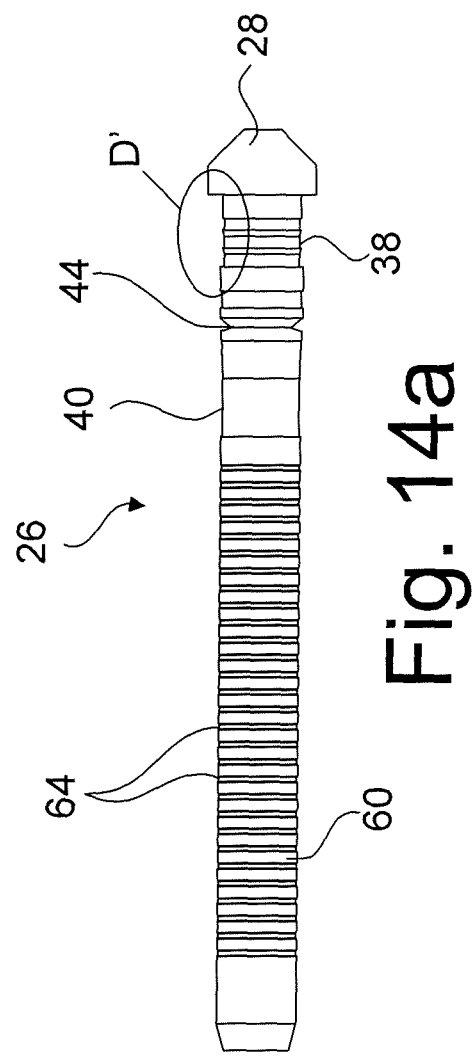
FIG. 14a is a side elevation of the stem of the fastener of FIG. 13.
Figure 14B:
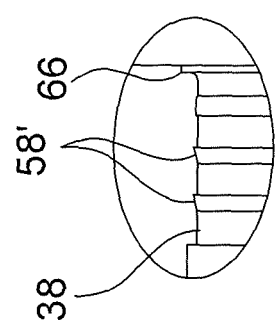
FIG. 14b is a detailed underhead view of the stem of FIG. 13a at D'.
Figure 15:
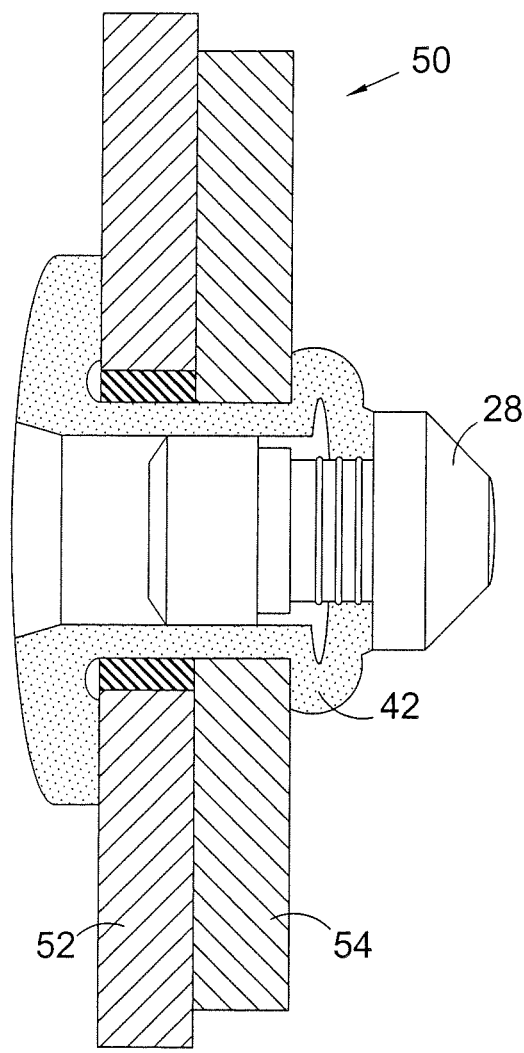
FIG. 15 is a cross-sectional elevation of the fastener of FIG. 13 installed in a workpiece.
Figure 16:
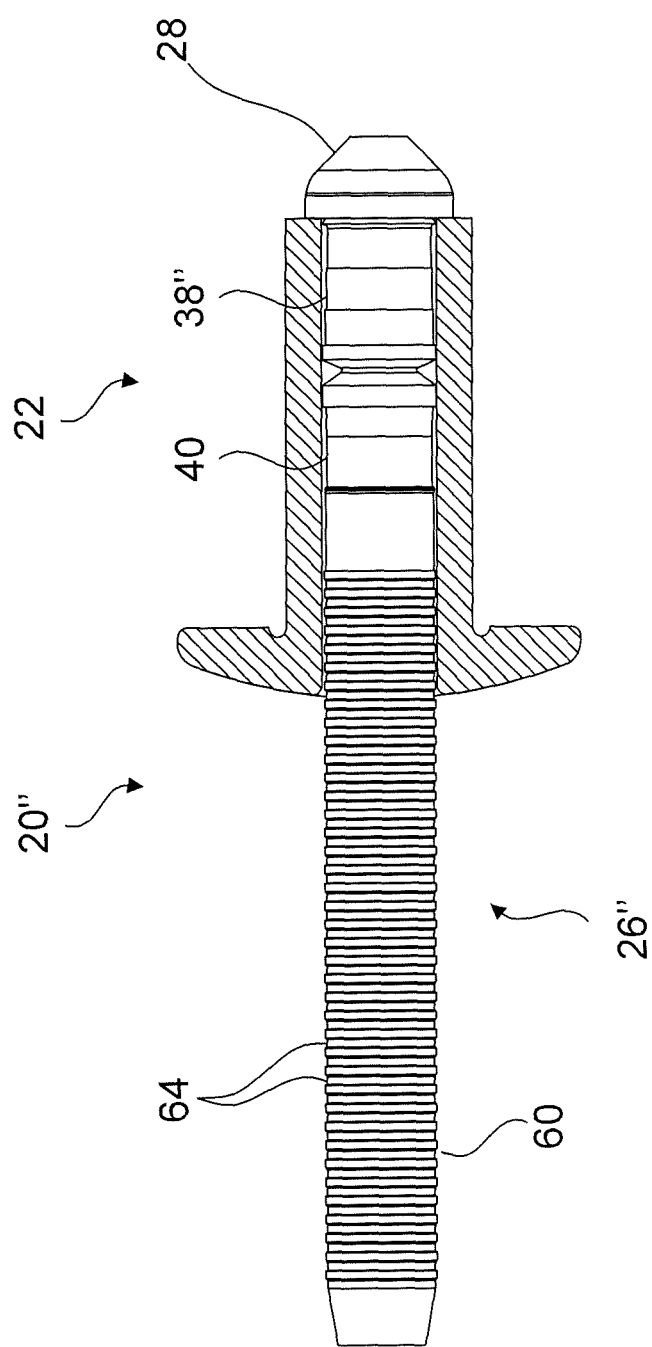
FIG. 16 is a side elevation of an alternative embodiment of fastener in accordance with the present invention, (with the body shown in cross-section), prior to crimping of the body, and prior to installation of the fastener in a workpiece.

FIGS. 10 and 11 illustrate the formation of a bulb 42 at the maximum grip value, and FIG. 12 illustrates the blindside footprint 56 at the maximum grip value.

In an alternative embodiment, a plurality of radial projections 58' may be provided, within the first waisted region 38. This alternative fastener 20' is illustrated in FIGS. 12 to 15. On crimping of the body 22' onto the stem 26', the multiple projections 58' are caused to embed into the body 22' in the same manner as the single projection 58 of the above embodiment.

In further alternative embodiments, the or each radial projection 58, 58' may have an alternative cross-sectional form, such as an asymmetric triangular form, or a form having a rounded tip, or a combination of both forms.

FIGS. 16 to 19 illustrate an alternative embodiment of fastener 20" wherein the first waisted region 38" of the stem 26" comprises steps 100, 102 and 104. This embodiment further comprises a ridge 106 in the first waisted region 38" and recess 108 under the stem head 28, as illustrated in detail in FIGS. 18b and 18c. The ridge 106 and recess 108 are created during manufacture of the stem 26. The recess is formed in a cold heading stage, and the ridge 106 is a by-product of the rolling the first waisted region 28, i.e. it is formed by material of the stem 26" which is displaced from the step 104 during rolling.

Figure 17:
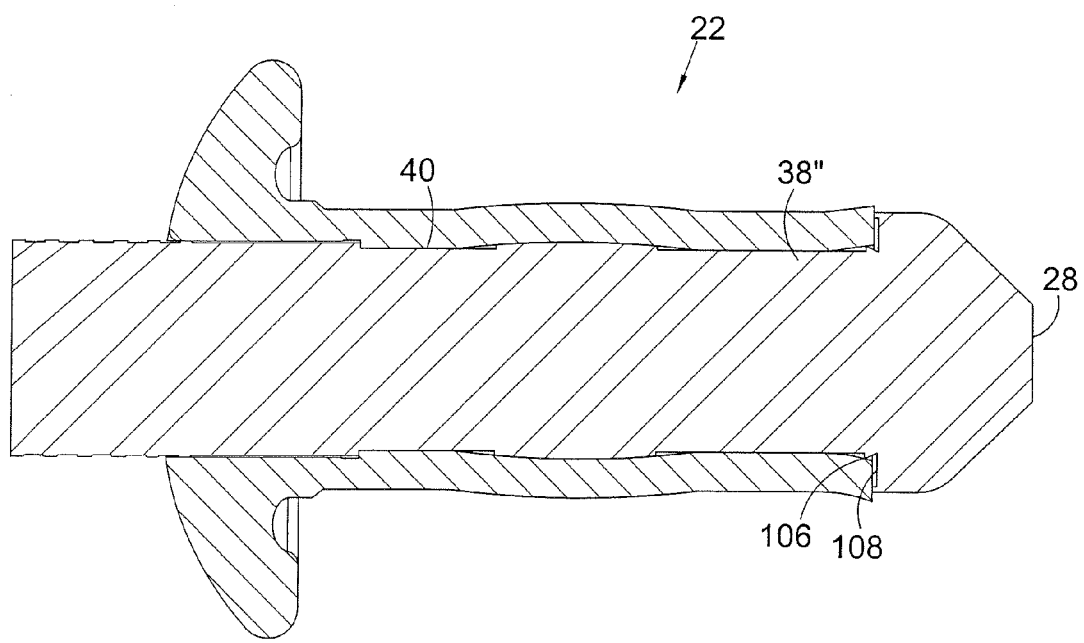
FIG. 17 is a partial cross-sectional elevation of the fastener of FIG. 16, after crimping of the body, and prior to installation of the fastener in a workpiece.
Figure 19:
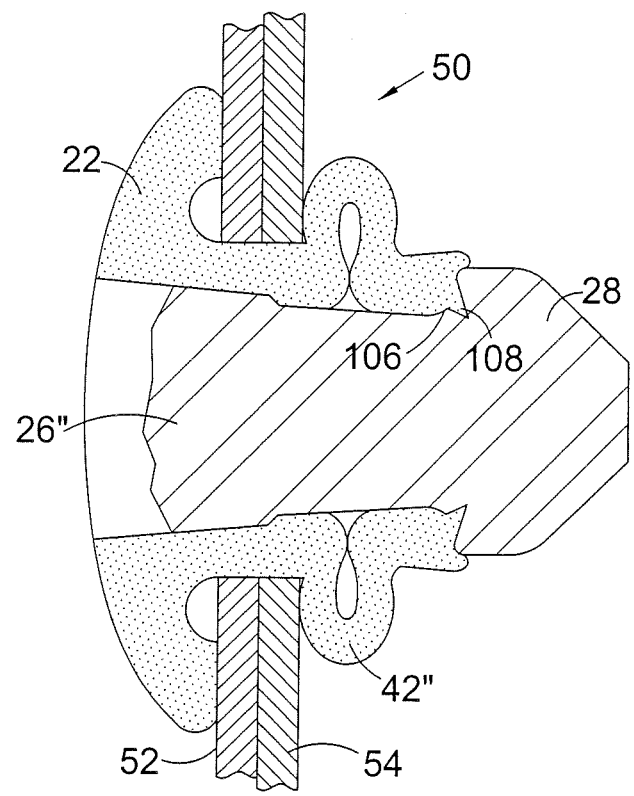
FIG. 19 is a cross sectional view of the fastener of FIG. 16 installed in a workpiece.

In contrast with the projections 58, 58' of the previous embodiments, as illustrated in FIG. 17 the ridge 106 is not caused to embed into the material of the body 22 during crimping of the body 22. Material of the body 22 is forced around the ridge 106, and into the recess 108, only during installation of the fastener 20" into a workpiece 50. As illustrated in FIG. 18, material of the body 22 has been forced into the recess 108 during installation, thereby preventing "stem head entry", and between the recess 108 and the ridge 106, thereby locking the body to the stem axially in the underhead region.

The invention claimed is:

1. A blind fastener for installation in a workpiece, the fastener comprising a body and a stem;
the body including a core, a head at a head end of the body, a tail end remote from the head end, and a radially expandable portion between the head end and the tail end;
the stem including a shaft, a radially enlarged head and a breakneck groove;
whereby, when the body is inserted into a suitable aperture in the workpiece and an installation force is applied to the body to urge the tail end of the body towards the workpiece, the reaction force is supported by the head end of the body, and the radially expandable portion of the body is thereby caused to deform radially outwards and axially towards the body head, to form a blind bulb which abuts a blind face of the workpiece and forms a blindside footprint;

wherein at least a first waisted region and a second waisted region are provided in an external wall of the stem, the first waisted region and the second waisted region having minimum diameters which are lower than the minimum diameter of the stem shaft, whereby, on assembly of the fastener prior to the radial and axial deformation of the radially expandable portion of the body caused by the said installation force being applied to the body to urge the tail of the body towards the workpiece when the body is inserted into a suitable aperture in the workpiece, the body is deformed such that material of the body enters the waisted regions thereby causing the body to comprise a barrel shape, the body including a first outer diameter adjacent the first waisted region, a second outer diameter adjacent the second waisted region, and a third outer diameter between the first and second waisted regions, the third outer diameter being greater than the first and second outer diameters; and wherein, prior to the radial and axial deformation of the radially expandable portion of the body, the first waisted region is located adjacent the stem head and the second waisted region is further away from the stem head than the first waisted region is located such that the breakneck groove is between the first waisted region and the second waisted region.

2. A blind fastener as claimed in claim 1 wherein the stem further comprises a tapered portion leading up to at least one of the first waisted region and the second waisted region.

3. A blind fastener as claimed in claim 2 wherein the tapered portion is located between the breakneck groove and the second waisted region.

4. A blind fastener as claimed in claim 3 wherein the stem further includes a stepped portion between the first waisted region and the stem head, the stepped portion having a diameter intermediate the minimum diameter of the first waisted portion and the diameter of the stem head.

5. A blind fastener as claimed in claim 1 wherein one or more radial projections are provided on the stem at one or more of the waisted regions.

6. A blind fastener as claimed in claim 5 wherein the or each radial projection has an asymmetric triangular cross-sectional form.

7. A blind fastener as claimed in claim 5 wherein the or each radial projection has rounded tip.

8. A blind fastener as claimed in claim 1 wherein the body further comprises an annular underhead recess.

9. A blind fastener as claimed in claim 1 wherein the first waisted region comprises plurality of stepped portions.

10. A blind fastener as claimed in claim 1 wherein the stem further comprises an annular underhead recess.

11. A blind fastener as claimed in claim 10 wherein the first waisted region further comprises a protruding ridge of stem material adjacent the recess.

* * * * *